Patented Aug. 10, 1943

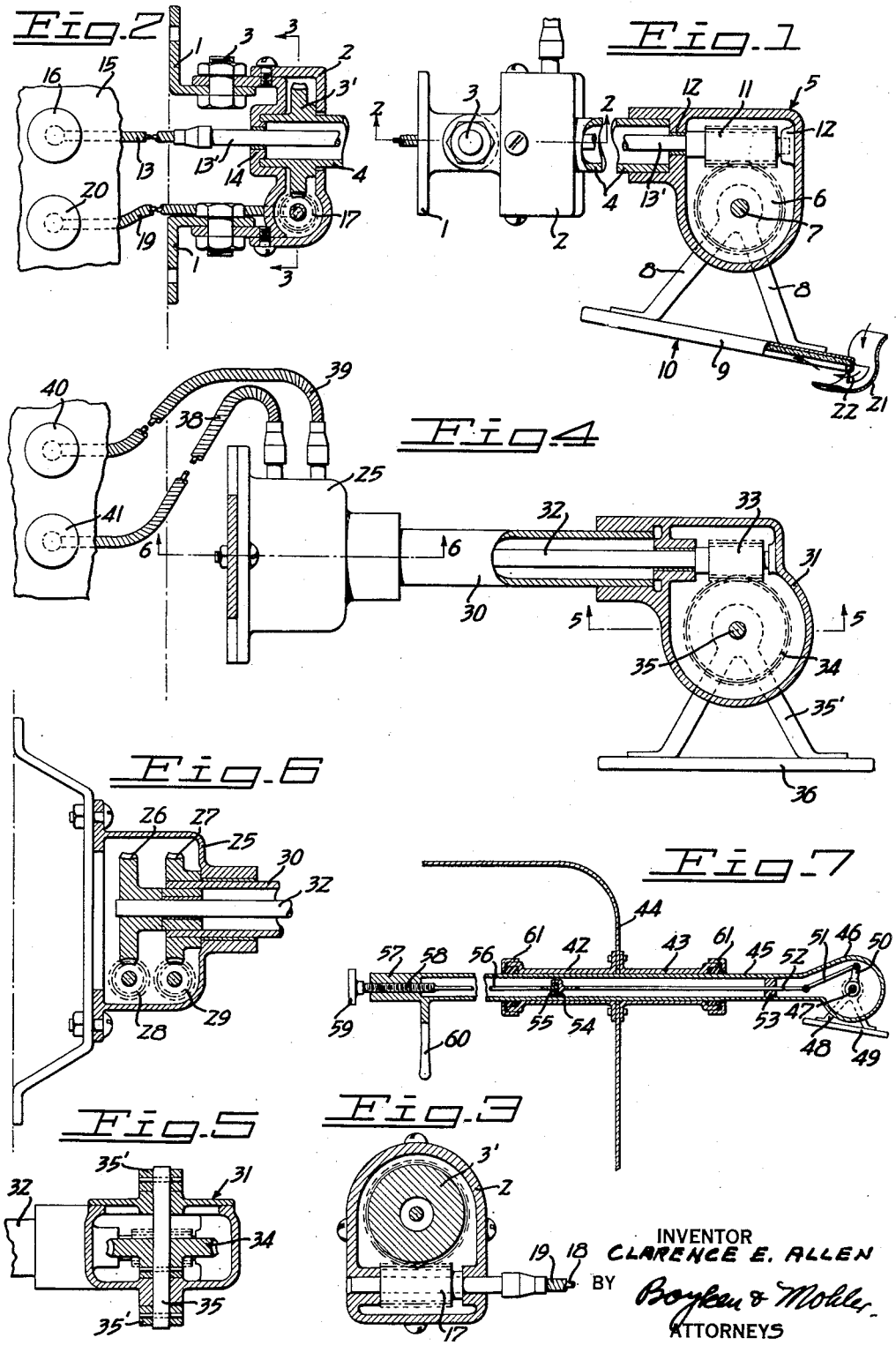

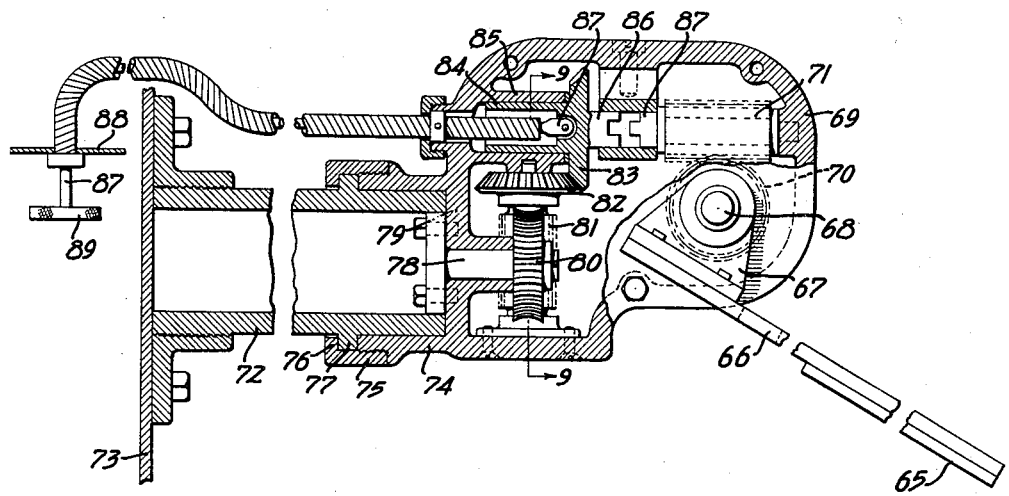
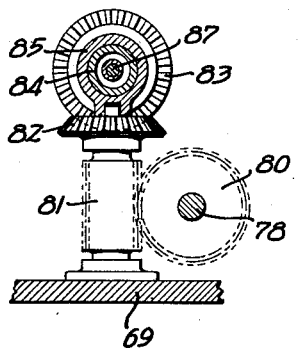

2,326,316

UNITED STATES PATENT OFFICE 2,326,316

REAR-VIEW MIRROR

Clarence E. Allen, San Francisco, Calif.

Application February 26, 1940, Serial No. 320,764

3 Claims. (Cl. 248—288)

This invention relates to rear-view mirrors, for use on automobiles generally, and more particularly, for use on busses, trucks and the like where the mirror may be remote from the driver and therefore relatively inaccessible for adjusting.

One of the objects of the invention is an improved rear-view mirror provided with means for adjusting the same from a remote point for movement thereof in planes angularly disposed relatively.

Another object of the invention is a rear-view mirror and improved means for automatically clearing the reflecting side of the mirror of water, dirt, etc., while the vehicle carrying the mirror is in normal forward motion.

Another object is the provision of a rear-view mirror with improved means for mounting the same for moving the mirror bodily toward the side of the vehicle from which it is projected, to thereby prevent injury to the mirror by objects sufficiently close to the vehicle to otherwise strike the same.

A still further object is simple means for adjusting a rear-view mirror in a plurality of different planes, from a remote point, and which means also provides for automatically locking the mirror in adjusted position.

An additional object is a rear view mirror in combination with a single actuating member adapted to cause the mirror to move to a plurality of different positions in different planes, as desired, and which member is accessible to the driver of an automobile without his leaving his driving position, while the mirror is at a remote point spaced outwardly of the vehicle from the side of the automobile remote from the driver's seat.

Other objects and advantages will appear in the drawings and claims annexed hereto.

Briefly described, in a passenger bus, and in some trucks, there is a rear-view mirror projecting outwardly of the right-hand side of the bus as well as from the left-hand, or driver's side, in order that the driver may observe the rear from the right-hand side of the bus to avoid turning to the right in the event another automobile should be on the right-hand side of the bus and to enable the driver to avoid striking a stationary car or other object, in turning in to the curb or to the side of the road. The advantages of the mirror on the right-hand side are equally valuable to truck drivers.

The drivers of busses and trucks frequently change, and in busses, in particular, these changes are made quickly in order not to fall behind schedule on a run. However, the new driver may be shorter or taller than the driver whom he has relieved, or the new driver may prefer to shift the driver's seat to suit his particular desires. In all such instances, which are the rule rather than the exception, the right-hand, as well as the left-hand mirror, is out of adjustment for the new position of the driver's eyes. The left-hand mirror is fairly easy to adjust, being next to the driver's seat, except where the busses are air-conditioned and kept closed. But the right-hand mirror is seldom properly adjusted where the driver himself must make the adjustment, since he cannot remain seated while shifting the mirror. The proper adjustment, if attained, is mostly merely a result of trial and error. In any event, much time would be lost if the driver attempted to get a perfect adjustment, hence the drivers cannot spare the necessary time, and keep to the driving schedule, with the result that the mirror is not adjusted properly, and accidents occur.

With trucks, it is often desirable for the driver to not only see the road alongside the truck and rearwardly, but to also be able to observe the load carried.

With my invention, the driver can quickly and accurately adjust the rear view mirror to exactly the position where it will best function for viewing rearwardly, without the driver leaving his seat, and while actually driving the vehicle. Also, the mirror can be moved for viewing the load carried by the vehicle, and quickly returned to the desired position for viewing rearwardly of the vehicle.

In the drawings, Fig. 1 is a horizontal sectional view of one form of the invention, with certain parts in elevation.

Fig. 2 is a sectional view taken along line 2—2 of Fig. 1.

Fig. 3 is a sectional view taken along line 3—3 of Fig. 2.

Fig. 4 is a plan view of another form of the invention, partly in section.

Fig. 5 is a sectional view taken along line 5—5 of Fig. 4.

Fig. 6 is a sectional view taken along line 6—6 of Fig. 4.

Fig. 7 is a horizontal sectional view of another form of the invention.

Fig. 8 is a horizontal sectional view of a still further form of the invention, partly broken in length.

Fig. 9 is a sectional view taken along line 9—9 of Fig. 8.

In detail, referring to Figs. 1, 2, brackets 1 adapted to be secured to a lateral side of the vehicle, adjustably support a housing 2 thereon by means of vertical bolts 3 for swinging the housing in a horizontal plane.

The said housing rotatably supports a gear 3' thereon, which gear is secured on one end of an elongated, horizontally extending tube standard 4, the outer end of which tube carries a housing 5. Within housing 5 is a gear 6 secured to a vertical shaft 7 that is rotatably supported in the housing, the upper and lower ends of said shaft projecting above and below the upper and lower sides of the housing 5.

Laterally projecting brackets 8 are secured at one of their ends to the upper and lower ends of shaft 7, respectively, and the vertically disposed mirror 9 is secured to the outer ends of said brackets with the reflecting side 10 thereof facing rearwardly, and the back facing forwardly, with respect to the normal forward direction of the vehicle.

A worm gear 11 supported in suitable bearings 12 in said housing 5, is in mesh with the gear 6, so that upon rotation of said worm gear, the mirror will be caused to swing in a horizontal plane. Connected with said worm gear 11 is a flexible cable 13 extending through tube 13' and through the wall 14 of housing 2, that is adjacent the side of the vehicle, and said cable extends through the side of the automobile to a position in front of the driver's seat, where the cable turns and passes through the instrument panel 15. This cable is of the conventional type ordinarily employed in driving speedometer mechanism, which comprises an outer sheath enclosing a spirally wound cable therein that is rotatable within the sheath. The worm gear 11 is secured to one end of the rotatable inner cable, and a knob 16 projecting from the side of the instrument board that faces the driver is secured to the opposite end of said inner cable.

Within the housing 2 is a worm gear 17 in mesh with gear 3', which gear is secured at one end to the inner cable 18 (Fig. 3) of a flexible outer sheath 19 that is identical in structure with cable 13, and the opposite end of said inner cable is secured to a knob 20 that is adjacent knob 16.

Along the vertical edge of mirror 9 that is outermost with respect to the vehicle, I provide a curved strip of metal 21, secured to the frame of the mirror at spaced points as at 22. This strip 21 is curved transversely of its length with one longitudinal margin projecting past the rear side of the mirror and curved outwardly while the opposite margin extends slightly over the rearwardly facing reflecting surface of the mirror.

In operation, the driver, upon taking his seat adjacent the left-hand side of the bus or vehicle, may readily adjust the mirror by turning either knob 16 or 20, while looking toward the mirror, and without leaving his seat, thus quickly positioning the reflecting side of the mirror for obtaining the correct view rearwardly at the right-hand side of the vehicle.

In traveling on the highway in rain, snow or sleet, there is ordinarily a slightly reduced air pressure on the reflecting side of the mirror caused by the head wind passing the mirror. This tends to cause dirt, mud and drops of water to be deposited on the reflecting side, thus rendering the mirror useless. The strip 21 functions to deflect air across the reflecting surface of the mirror, thus keeping said surface relatively clear.

Also in driving into bus stations or where the bus is driven into close quarters, the operator may swing the tube 4, carrying the mirror, inwardly sufficiently close to the side of the bus to clear any obstruction.

The invention as disclosed in Figs. 4, 7, 8 is adapted to function in generally the same manner as the device of Fig. 1.

In this other form of invention, a housing 25 secured to the side of the vehicle carries driven gears 26, 27 therein with drive worm gears 28, 29 in mesh with gears 26, 27, respectively. The gears 26, 27 are concentrically disposed with respect to a common central axis, the latter being the longitudinal axis of tube 30 extending from a side of said housing, and secured to the hub of gear 27 for rotation with the latter.

A housing 31 is secured to the outer end of tube 30 and a shaft 32 secured at one end to gear 26 extends through tube 30 into housing 31, where said shaft carries a worm gear 33 within said housing. Gear 33 is in mesh with gear 34, the latter being secured on a vertical rotatable shaft 35.

The upper and lower ends of shaft 35 rotatably extend through the upper and lower sides of housing 31, and bracket arms 35' are secured at one of their ends to the ends of shaft 35, respectively. The opposite ends of arms 35' carry a vertically disposed mirror 36 positioned with its reflecting side disposed exactly as described for mirror 9 of Fig. 1.

The worm gears 28, 29 in housing 25 are connected to the inner cable of flexible shafts 38, 39, which shafts extend through the side of the bus and to the instrument board, where knobs 40, 41 are provided for turning the inner cables in the same manner as described for the cables 13, 19 of Fig. 1.

In operation, upon turning knob 40, the driver on the driver's seat may cause bodily rotation of the mirror about an axis parallel with the longitudinal axis of the bus, and upon turning knob 41, the mirror will be revolved about the axis of shaft 35, thus enabling the driver to quickly obtain the desired adjustment, without leaving his seat.

The type of invention illustrated in Fig. 7, also provides a remote control for a mirror, which mirror has been found more suitable for use on trucks where the driver's cab is relatively narrow, thus reducing the necessity for the long cable or cables described for the device of Figs. 1, 2.

In the invention as shown in Fig. 7, I provide a pair of elongated, axially aligned, tubular bearings 42, 43 secured to the inside and outside of the side 44 of the vehicle, with an opening between the adjacent ends of said bearings for passage of a single elongated tube 45 therethrough projecting at opposite ends outwardly of the outer ends of bearings 42, 43.

The outer end of tube 45 (outside the vehicle) carries a housing 46, which housing has a vertical shaft 47 journalled in the upper and lower sides thereof, with the opposite ends of said shaft projecting outwardly of the upper and lower sides of the housing where they connect with one of the ends of laterally projecting upper and lower brackets 48 that carry the mirror 49 in vertical position.

Within the housing 46 an arm 50 is secured at one end to shaft 47 while the opposite end of the arm is pivotally connected to one end of a link 51. The opposite end of link 51 is pivotally connected to the outer end of a rod 52 that slidably extends longitudinally through tube 45, a sliding block 53 being carried by the rod for slidably supporting the rod centrally within said tube.

The inner end of rod 52 is formed with a socket member 54 rotatably receiving a head 55 on a second rod 56 that is in axial alignment with rod 45. The rod 56 extends from the head end 55 thereof inwardly (into the vehicle) within the tube 45, and through a block 57 that is secured to the inner end of tube 45. The rod 56 is formed with threads 58 where it passes through block 57, for engaging threads in the block, and a turning knob 59 is secured to the end of said rod 56 that projects from block 58. The tube 45 is formed with a laterally projecting handle 60 adjacent the knob 59.

In operation the driver merely turns knob 59 to revolve the mirror 49 about the axis of shaft 47, since such turning of the knob will move rod 52 in or out, thus rotating shaft 47 in one direction or the other. Also, the driver may move handle 60 in one direction or the other in a vertical plane to revolve the mirror 49 about the axis of the tube 45.

The bearings 42, 43 carry rubber washers at their ends adapted to be held in place by screw caps 61 that may be tightened to provide the desirable frictional gripping of the tube 45 to prevent accidental turning of the tube 45.

It is also to be noted that the tube 45 may be moved longitudinally of the bearings 42, 43 by manipulation of handle 60, thus enabling the driver to move the tube in or out to position the mirror closer to the vehicle, or further therefrom.

In some respects, the form of device illustrated in Fig. 8 is preferable, since in this device I provide for moving the mirror in two directions, that is, about a vertical axis and about a horizontal axis, by use of a single flexible cable.

In this form of invention, the mirror 65 is carried at the outer ends of a pair of arms 66, while the inner ends of said arms are connected by brackets 67 to the upper and lower ends of a vertical shaft 68 that rotatably extends through a housing 69, the upper and lower ends of said shaft extending outward of the upper and lower sides of said housing for carrying said brackets above and below the housing. Since arms 66 and brackets 67 are disposed one above the other, only the upper arm and bracket above housing 69 are shown in Fig. 8; the lower arm and bracket being identical in structure to the upper arm and bracket.

A worm wheel 70 is secured to said shaft 68 within said housing, which worm wheel is in mesh with worm gear 71 rotatably mounted in bearings carried by the housing walls.

The housing 69 is itself rotatably supported on the outer end of a horizontally extending tubular standard 72, which standard is received at its inner end to the side 73 of the vehicle. One manner of rotatably securing the housing on said standard, is to form a cylindrical bearing 74 on the side of the housing adjacent the vehicle, which bearing rotatably fits over the outer end of standard 72 and is secured therein by a cap 75 threadedly secured to bearing 74 and formed with an inwardly directed flange 76 engaging over an annular flange 77 on the standard 72, as best seen in Fig. 8.

Coaxial with the standard 72 is a shaft 78 rigidly secured in any suitable manner at one end to plate 79 that is in turn secured rigidly in any suitable manner in the end of the standard and extending into the housing at its opposite end. The end of shaft 78 within housing 69 carries a worm wheel 80 rigidly secured thereto and in mesh with a worm gear 81 rotatably supported in bearings carried by the housing walls. This worm gear 81 carries at one of its ends a bevel gear 82, the teeth of which are adapted to be engaged by the teeth of an axially slidable bevel gear 83.

The shaft 84 to which gear 83 is secured is rotatably and longitudinally slidable in bearing 85 formed in the wall of the housing that is adjacent the vehicle. Also a projecting clutch member 86, concentric with the axis of gear 83, projects from the side of the latter adjacent the worm gear 71, the central axis of the latter being in alignment with the central axis of gear 83. The end of worm gear 71 adjacent gear 83 carries a clutch member 87 that is complementary to clutch member 86.

When the gear 83 is in mesh with gear 82, the clutch members 86, 87 are disengaged, but upon sliding the gear 83 toward gear 71, the said clutch members will be engaged, while the gears 82, 83 will be disengaged.

The means for rotating and sliding gear 83, comprises the inner cable 87 that extends through the stationary outer sheath of a flexible cable such as has already been described. The one end of cable 87 is secured to gear 83 while the adjacent end of the sheath covering the inner cable is secured to the housing 69. The flexible cable extends from the housing alongside tube 72, and through side 73 of the vehicle to a point on the instrument board 88 that is disposed adjacent the driver. A knob 89 is connected to the end of the inner cable 87 that is at the end thereof opposite gear 83.

In operation, in the position shown in the drawings, upon the driver turning knob 89, the gears 81, 82, and 83 will be actuated for rotating the housing 69 on a horizontal axis coaxial with worm wheel 80, thus moving the mirror 65 about said axis. Upon the operator pushing knob 89 inwardly, or toward the instrument board, and then rotating said knob, the gears 82, 83 will be disengaged, and worm gear 71, which is in mesh with worm wheel 70 will be actuated for revolving the mirror about a vertical axis.

The provision of the arms 66, which may be relatively long as compared to the mirror supporting arms in the other disclosures, is desirable in that the main weight of the gears and housing 69 is closer to the vehicle, thus lessening the strain on the standard 72. Also, by this structure, the mirror may be readily swung bodily inwardly toward the vehicle by actuation of the knob 89 to withdraw upon the vehicle entering a garage or station upon where it might otherwise strike an obstruction.

In the invention as disclosed in Fig. 8, it is also apparent that the heads or gear boxes and mirrors may be readily adapted to any length of supporting standard, thus the gear boxes and mirrors may be made as units separate from the standards, and then attached to the standards of the desired lengths.

The use of the worm gears in the invention as disclosed in all of the figures, except Figure 7, is highly desirable, since said gears provide for positively locking the mirror in any position of adjustment irrespective of the strain caused by head wind pressure. Also the use of worm gear drives, makes it easy to adjust the mirror through the use of a small rotating knob on a flexible shaft, as described.

Having described my invention, I claim:

1. A rear-view mirror supporting structure comprising; a standard; a pair of worm gears; a housing carried on one end of said standard; mirror supporting means carried on one end of said standard; a pair of worm wheels in mesh with said worm gears locked by the teeth of said worm gears against relative rotation when said worm gears are stationary; separate driven means connecting between each of said worm wheels and said mirror supporting means for revolving said mirror supporting means in separate planes intersecting each other at right angles when said worm gears are rotated; said driven means including elements supporting said mirror supporting means for revolving of the latter in said planes; said housing enclosing said worm gears and said worm wheels.

2. A rear-view mirror supporting structure comprising. a tubular standard. a pair of worm gears; a housing secured to one end of said standard enclosing said worm gears; mirror supporting means revolvable in separate planes intersecting each other at right angles; a pair of worm wheels respectively in mesh with said worm gears locked by the teeth of the latter against relative rotation when the latter are stationary; driven means positively connecting said worm wheels with said mirror supporting means for revolving said mirror supporting means in said separate planes; means extending longitudinally through said standard and out of the end thereof opposite the mounting said housing for rotating one or the other of said worm gears as desired; and movable clutch means in said housing for detachably engaging said last mentioned means with either one or the other of said worm gears as desired.

3. A rear-view mirror supporting structure comprising; a tabular standard; a pair of worm gears; a housing carried on one end of said standard enclosing said worm gears; mirror supporting means carried by said housing; a pair of worm wheels in said housing in mesh with said worm gears respectively and locked by the teeth of the latter against rotation when the latter are stationary; driven means positively connecting between said worm wheels and said mirror supporting means against slippage of said mirror supporting means relative to said worm wheels and actuated by rotation of said worm gears for revolving said mirror supporting means in separate planes intersecting each other at right angles; said mirror supporting means including a bracket member extending outwardly of said housing; means on the projecting end of said bracket member for securing a rear-view mirror thereto; and means extending longitudinally of said standard therethrough for rotating said worm gears.

CLARENCE E. ALLEN.